United States Patent
Wang et al.

(10) Patent No.: US 7,110,044 B2
(45) Date of Patent: Sep. 19, 2006

(54) IMAGE DETAIL ENHANCEMENT SYSTEM

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 578 days.

(21) Appl. No.: 10/402,280

(22) Filed: Mar. 27, 2003

(65) Prior Publication Data

US 2004/0189874 A1    Sep. 30, 2004

(51) Int. Cl.
*H04N 5/20* (2006.01)

(52) U.S. Cl. ...................................... 348/627; 348/625

(58) Field of Classification Search ............... 348/622, 348/623, 627, 607; H04N 5/20
See application file for complete search history.

(56) References Cited

U.S. PATENT DOCUMENTS

| | | | | |
|---|---|---|---|---|
| 3,903,485 A | * | 9/1975 | Dolby | 333/14 |
| 5,389,978 A | * | 2/1995 | Jeong-Hun | 348/622 |
| 5,479,215 A | * | 12/1995 | Chmielewski et al. | 348/627 |
| 6,728,381 B1 | * | 4/2004 | Hosoya | 381/94.1 |
| 6,847,738 B1 | * | 1/2005 | Scognamiglio et al. | 382/260 |
| 2003/0112374 A1 | | 6/2003 | Wang et al. | 348/625 |
| 2003/0113032 A1 | | 6/2003 | Wang et al. | 382/264 |
| 2005/0058365 A1 | | 3/2005 | Wang et al. | 382/266 |
| 2005/0094877 A1 | | 5/2005 | Wang et al. | 382/199 |
| 2005/0163380 A1 | | 7/2005 | Wang et al. | 382/266 |

* cited by examiner

*Primary Examiner*—Michael H. Lee
(74) *Attorney, Agent, or Firm*—Kenneth L. Sherman, Esq.; Michael Zarrabian, Esq.; Myers Dawes Andras & Sherman, LLP

(57) ABSTRACT

A detail enhancement system uses a detail filter bank including multiple detail filters covering different frequency ranges. An input video signal representing a digital image is processed in the detail filter, wherein detail signals are extracted by the detail filters at different frequency ranges. Shoot suppression blocks and coring blocks are provided for each detail filter to prevent overshoot/undershoot artifacts and small ringing artifacts, respectively. The overall detail signal is amplitude scaled, and added back to the input signal as an enhancement, to generate a detail enhanced output signal.

26 Claims, 7 Drawing Sheets

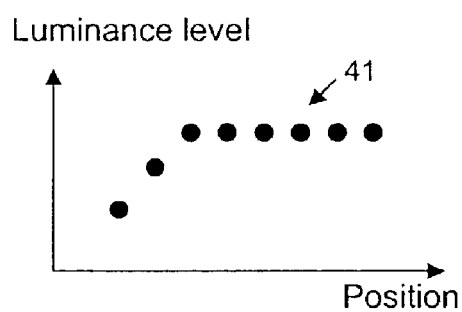
FIG. 4A
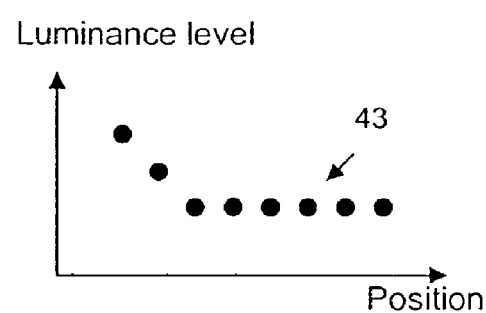
FIG. 4B
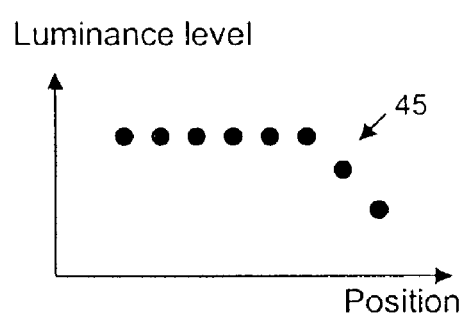
FIG. 4C
FIG. 4D

IMAGE DETAIL ENHANCEMENT SYSTEM

FIELD OF THE INVENTION

The present invention relates to image detail enhancement, and in particular, to image detail enhancement to improve the sharpness of an image.

BACKGROUND OF THE INVENTION

In digital video systems such as a digital TV system, different incoming video images may have very different characteristics depending on the video format and the original video source. Some images may contain many high frequency components, indicating large amount of fine details or sharp edges. Other images may contain fewer high frequency components, and appear relatively smooth. Some video images in a high definition format may be generated by conversion from a standard definition video source. While other digital video images may be generated from an analog video source. Therefore, different video images may be quite different in terms of their signal frequency range and frequency distribution.

Image detail enhancement has been a continuing research topic. However, providing a good detail enhancement system that is suitable for different types of digital video images mentioned above, remains to be addressed by conventional solutions.

BRIEF SUMMARY OF THE INVENTION

The present invention addresses the above needs. In one embodiment, the present invention provides a detail enhancement method using multiple detail filters, each covering a different frequency range. An input video signal representing a digital image having pixels, is processed in each detail filter, whereby detail signals are extracted by the detail filters at different frequency ranges. Shoot suppression blocks and coring blocks are provided for each detail filter to prevent overshoot/undershoot artifacts and small ringing artifacts, respectively. Before the detail signals are added back to the input signal as an enhancement, an amplitude scaler is used to scale down the detail signal values that have amplitudes above a certain threshold. This prevents over-enhancement of the input signal.

The present invention also provides an image detail enhancement system including multiple detail filters. The detail filters are used to extract image details in different frequency ranges. In one example three detail filters are utilized, wherein the first detail filter is a high pass filter that covers the high end of the frequency range. The second detail filter is a band pass filter that covers the middle section of the frequency range. And, the third detail filter is another band pass filter that covers an even lower section of the frequency range than the second detail filter.

The image detail enhancement system further includes multiple coring blocks, wherein each detail filter is associated with a coring block separately. The output of each detail filter is provided to the coring block for processing. Further, a shoot suppression block is associated with each detail filter to check the luminance pattern of the pixels in the input image, centered with the current pixel, within the filtering range of each detail filter and calculate a shoot suppression factor accordingly.

For each detail filter, the output from its associated coring block and shoot suppression block as well as a gain coefficient are combined together. The combination results from all the three detail filters are then summed up and provided to an amplitude scaler. The amplitude scaler scales down the detail signal values in a non-linear manner so that larger amplitude values are scaled down more than smaller amplitude values. However after amplitude scaling, originally smaller amplitude values still have smaller amplitudes than those originally bigger amplitude values. The output from the amplitude scaler is added back to the original image as enhanced details.

BRIEF DESCRIPTION OF THE DRAWINGS

These and other features, aspects and advantages of the present invention will become understood with reference to the following description, appended claims and accompanying figures where:

FIGS. 4A–D show four example pixel luminance patterns that are likely to generate shoot artifacts in image detail enhancement using filter convolution.

DETAILED DESCRIPTION OF THE INVENTION

As noted above, in one embodiment, the present invention provides a detail enhancement method and system using a detail filter bank including multiple (e.g., three) detail filters covering different frequency ranges. For simplicity of description, and not limitation, the following description assumes that the data to be enhanced is in one dimension. For two dimensional image data, the processing may be performed along each dimension separately.

Figure 1A:
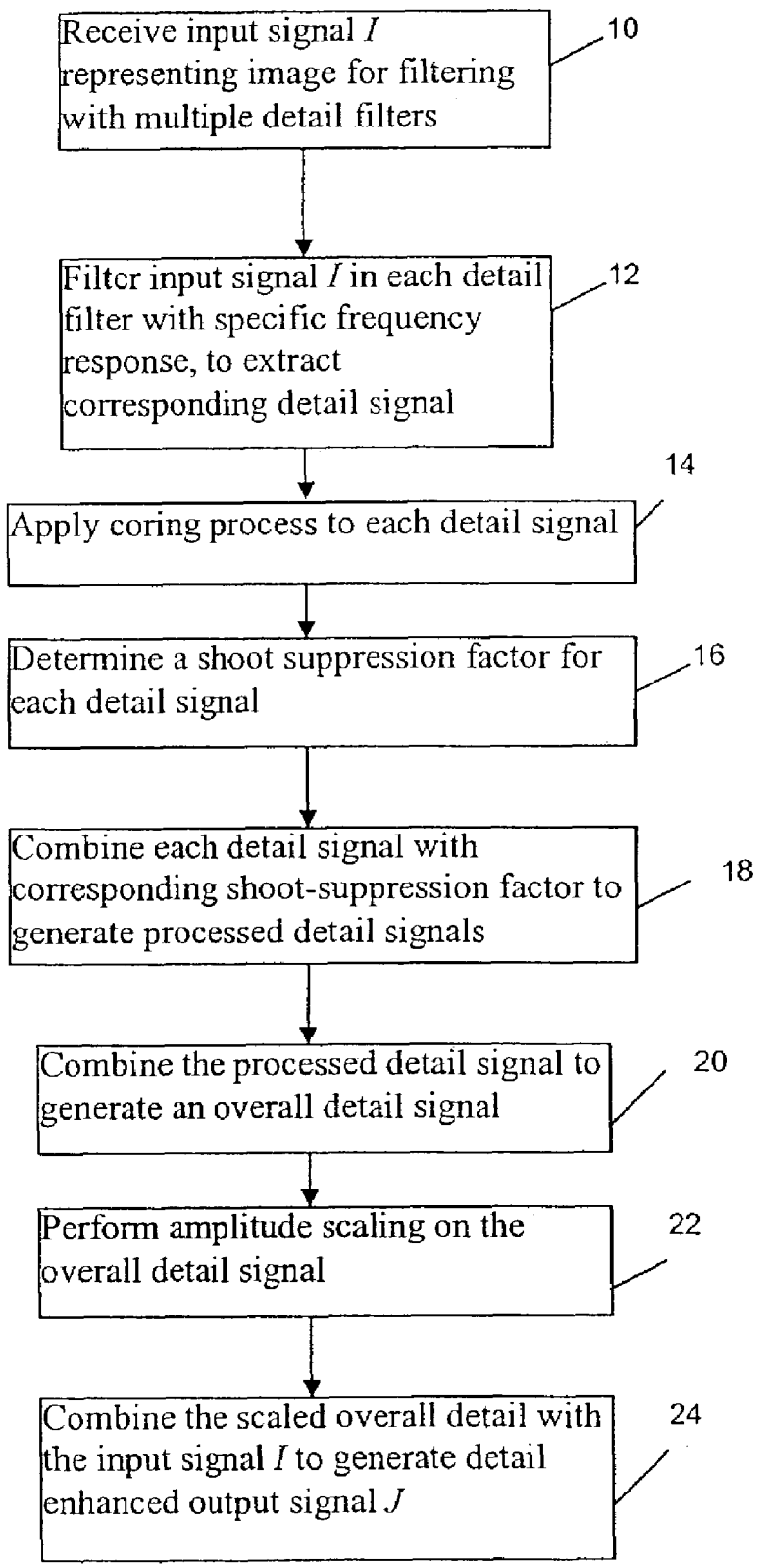
FIG. 1A shows the steps of an example detail enhancement method according to the present invention

The flowchart in FIG. 1A shows the steps of an example detail enhancement method according to the present invention. After receiving an input video signal I representing a digital image of pixels (step 10), the input video is processed such that detail signals are extracted at different frequency ranges (step 12). For each frequency range, each extracted detail signal is processed via a coring function to reduce noise and small ringing artifacts (step 14). Further, for each detail signal, the input signal is used in a shoot suppression function to determine a shoot suppression factor for reducing overshoot/undershoot artifacts (step 16). Then, for each frequency range, the signal generated by coring, and the corresponding shoot suppression factor, are combined to generate a corresponding processed detail signal (step 18).

The processed detail signals are combined to generate an overall detail signal (step 20), and then amplitude scaling is applied to that overall detail signal to scale down the detail signal values with amplitudes above a certain threshold and prevent over-enhancement of the input signal (step 22). Then, that scaled overall detail signal is combined with the input signal as an enhancement to generate a detail enhanced output signal J (step 24).

Figure 1B:
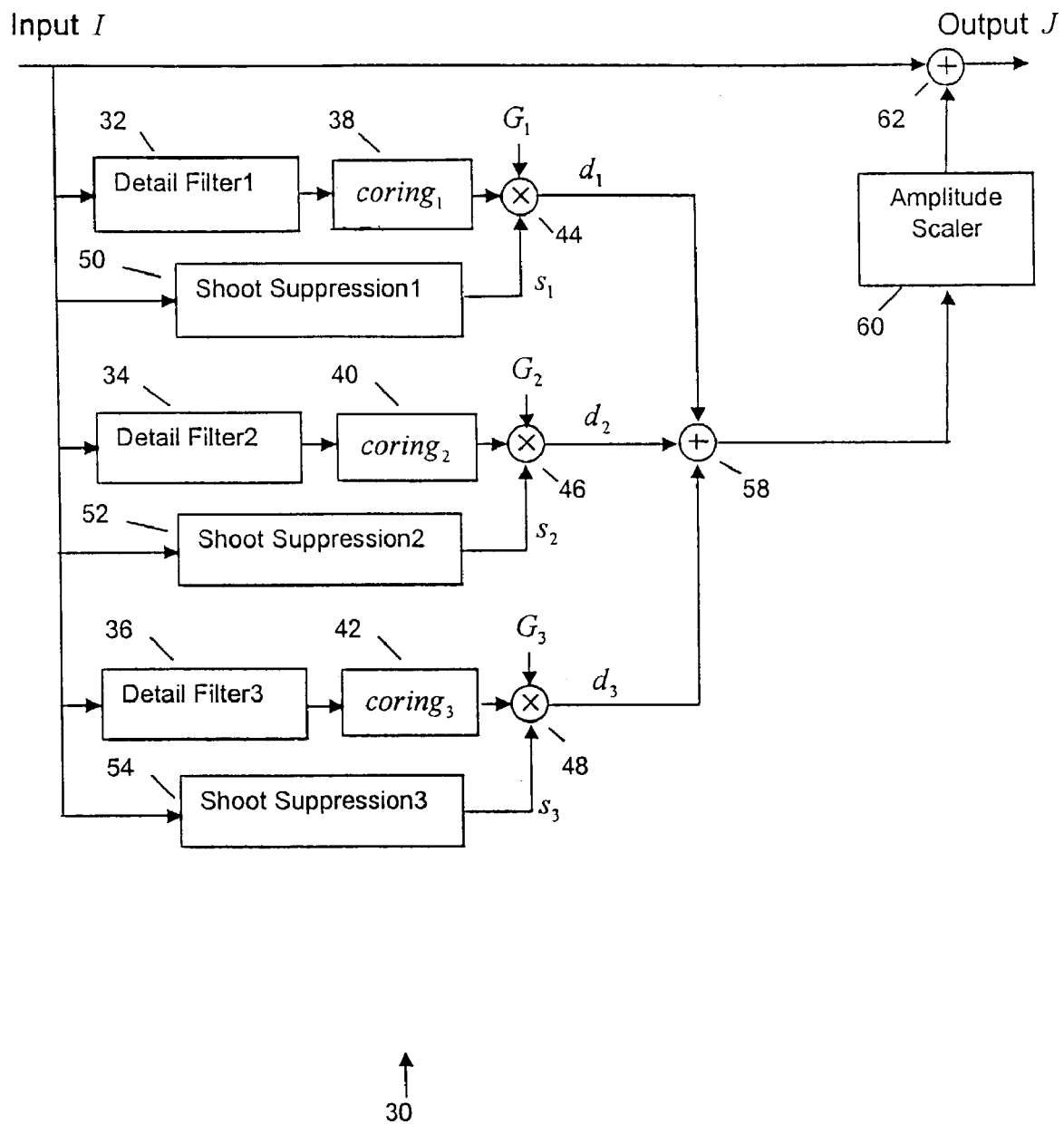
FIG. 1B shows a block diagram of an example architecture for a detail enhancement device/system according to the present invention.

FIG. 1B shows a block diagram of an example architecture for an embodiment of detail enhancement system 30 according to the present invention, implementing the above detail enhancement method. The detail enhancement system 30 comprises multiple detail filters 32, 34, 36, which enable the detail enhancement system 30 to enhance digital images with different characteristics and extract their corresponding details. The multiple filters 32, 34, 36 cover different frequency ranges. Although in the example of FIG. 1B, three detail filters 32, 34, 36, are shown, a different number of detail filters may be used for handling different frequency ranges.

Figure 2A:
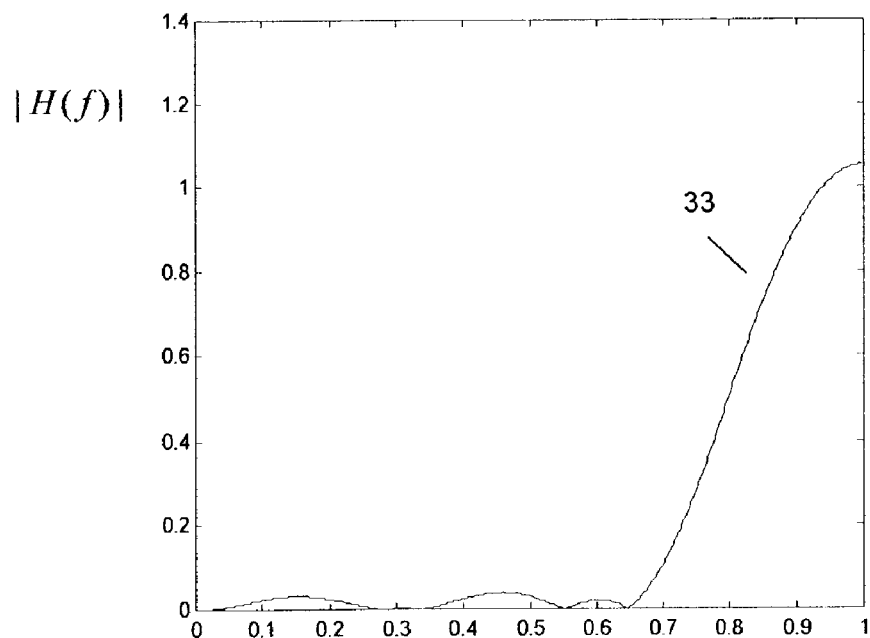
FIGS. 2A–C show frequency responses of three example detail filters used as a detail filter bank in the system of FIG. 1B.
Figure 2B:
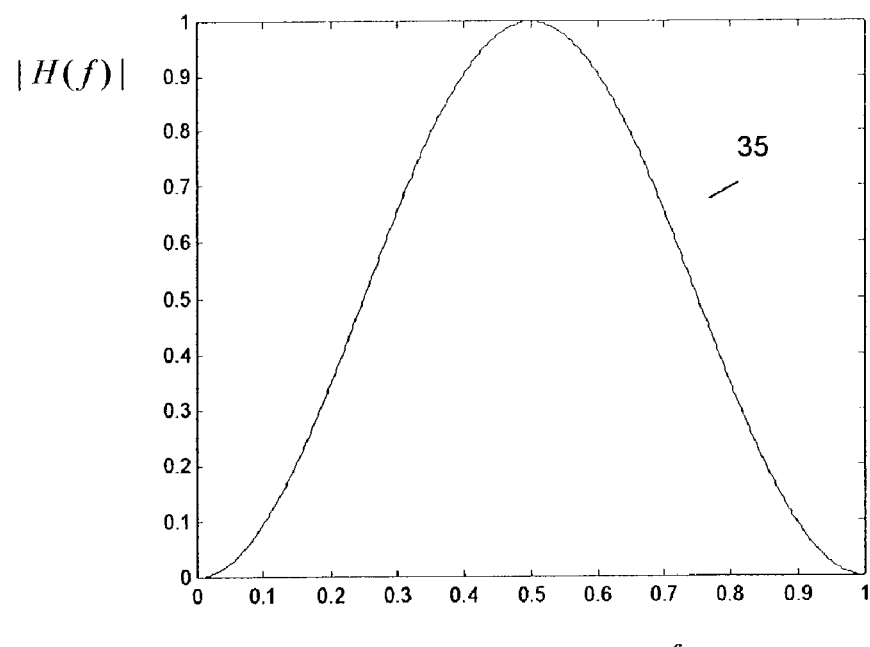
Figure 2C:
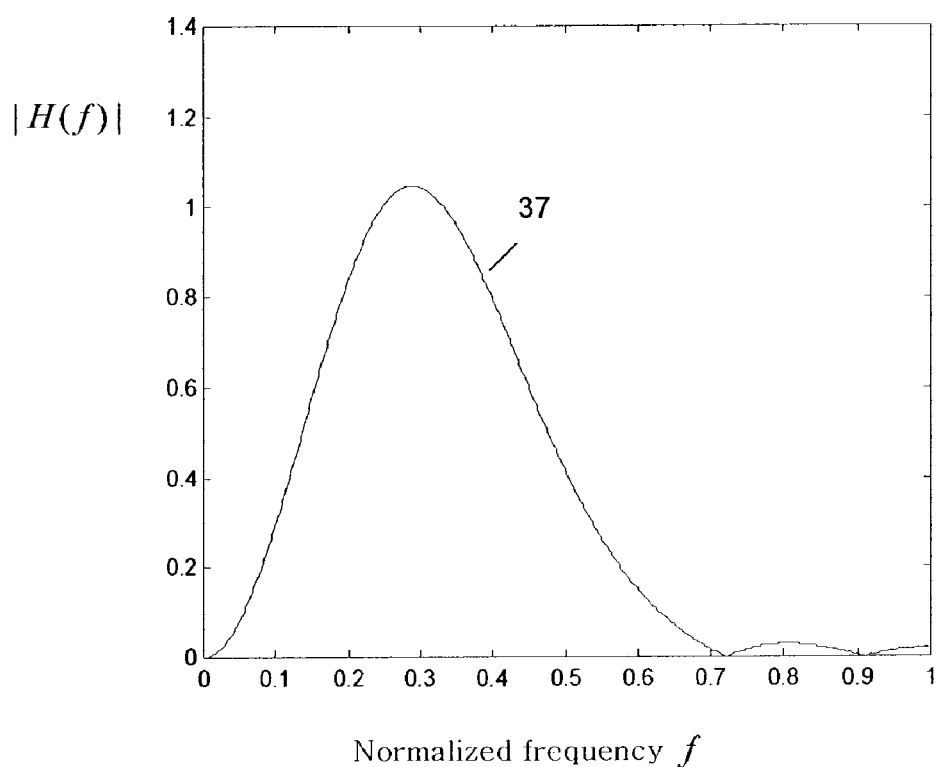

FIGS. 2A–C show plots of example frequency responses 33, 35, 37 for the three detail filters 32, 34 and 36, respectively. In FIGS. 2A–C, the horizontal axis represents normalized frequency, wherein for example, a frequency value of 1.0 corresponds to half the sample rate. The vertical axis represents the amplitude of frequency transfer function for the detail filer. In this example, the detail filter 32 is a high pass filter, and covers the high end of the frequency range. The detail filter 34 is a band pass filter and covers the middle section of the frequency range. And, the detail filter 36 is another band pass filter that covers an even lower section of the frequency range than the detail filter 34.

The three detail filters 32, 34 and 36, work together as a detail filter bank, wherein each filter targets a different frequency range. In most cases, the detail filters 32 and 34 are efficient in extracting details from an image. For low frequency images, such as scaled-up images, the detail filter 36 can help extract details in an even lower frequency range. Further description of an example detail filter bank is provided in commonly assigned, co-pending patent application Ser. No. 10/355,721, filed on Jan. 31, 2003, titled "Method and Apparatus of Image Detail Enhancement Using Filter Bank", incorporated herein by reference.

Referring back to FIG. 1B, the detail enhancement system 30 further includes three coring blocks 38, 40 and 42, wherein the output of each of the detail filters 32, 34, 36 is fed into one of the coring blocks 38, 40, 42, respectively. According to the present invention, each of the example coring blocks 38, 40 and 42 functions to prevent small ringing artifacts around edge areas in an image. Each coring block also functions to prevent noise artifacts from being enhanced.

In one embodiment, two defining parameters are associated with each of the coring blocks 38, 40, 42. The first parameter relates to the dynamic range of all the data to be processed in each coring block, and the second parameter relates to a threshold value for coring. Based on the characteristics of each detail filter and the frequency distribution of noise, the corresponding coring block is configured to have appropriate data dynamic range and threshold value parameters.

Figure 3:
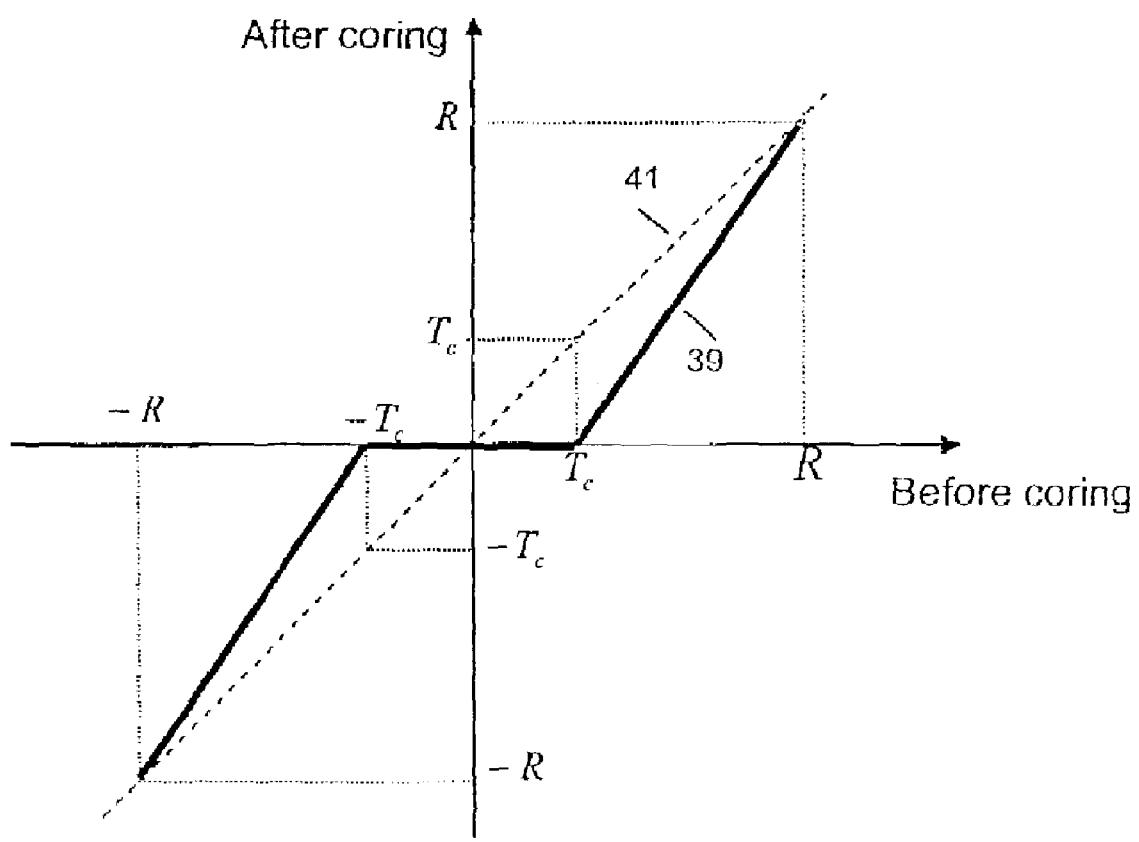
FIG. 3 shows an example coring function used in the system of FIG. 1B.

In one example implementation, assuming that the data dynamic range for a coring block is R and the threshold value is $T_c$, a coring function can be characterized as shown by an example curve 39 in FIG. 3. The horizontal axis represents data before coring, (i.e. the original detail signal) and the vertical axis represents the data after coring. The 45 degree dashed line 41 indicates the case of no coring. The solid curve 39 shows attributes of the coring function. According to the example coring function, any value in the range $[-T_c, T_c]$ has a coring value of 0 after coring. A value of either R or −R has a coring value unchanged from its original value. Any value in the range $[-R, -T_c]$ has a coring value between −R and 0. Similarly, any value in the range $[T_c, R]$ has a coring value between 0 and R. For an arbitrary value x in the range $[-R, R]$, the coring value can be expressed as relation (1):

$$\text{coring}(x) = \begin{cases} (\max(x, T_c) - T_c) * R / (R - T_c) & \text{if } x \in [0, R] \\ (\min(x, -T_c) + T_c) * R / (R - T_c) & \text{if } x \in [-R, 0] \end{cases} \quad (1)$$

Referring back to FIG. 1B, the detail enhancement system 30 further includes three multipliers 44, 46, 48 and three shoot suppression blocks 50, 52, 54, wherein the output of each coring block 38, 40, 42 is connected with one of the three inputs of a corresponding multiplier 44, 46, 48, respectively. The other two inputs of each multiplier are: (i) a gain coefficient and (ii) the output from a corresponding shoot suppression block.

The gain coefficients, $G_1$, $G_2$ and $G_3$ are used to control the detail enhancement intensity for each detail filter 32, 34, 36, respectively. The gain coefficients can be implemented to be adjustable parameters in e.g. a digital TV system so that the sharpness of image can be adjusted by users as desired. Alternatively, the gain coefficients can be constants.

For each detail filter 32, 34, 36, each of the shoot suppression blocks 50, 52, 54, respectively, generates a shoot suppression factor $s_i$ at each pixel position. A goal of shoot suppression is to detect luminance patterns such as shown by example in FIGS. 4A–D, as those are the luminance patterns 41, 43, 45, 47, respectively, that are likely to generate overshoot/undershoot artifacts in detail enhancement using filter convolution. Within the filtering range of a detail filter, if the pixel luminance curve is close to one of the patterns shown in FIGS. 4A–D, the enhancement at that pixel position should be suppressed. The degree of suppression is determined by calculating a symmetry factor based on the luminance values of the neighboring pixels centered with the current pixel within the filtering range of the detail filter. An example shoot suppression mechanism is described in commonly assigned, co-pending patent application Ser. No. 10/345,554, filed on Jan. 16, 2003, titled "Method and Apparatus for Shoot Suppression in Image Detail Enhancement", incorporated herein by reference.

Referring back to FIG. 1B, each shoot suppression factor $s_i$, i=1,2,3, from a corresponding shoot suppression block 50, 52, 54, respectively, is provided to one of the three inputs of each of the corresponding multipliers 44, 46, 48, respectively, wherein $0 \leq s_i \leq 1$. The output signal $d_i$, i=1,2,3 from each multiplier 44, 46, 48, respectively, can be expressed by relation (2):

$$d_i = G_i * s_i * \text{coring}_i(f_i(I)) \quad i=1,2,3 \quad (2)$$

wherein $f_i$ is the convolution operation performed in a detail filter i.

Further, the detail enhancement system 30 includes a summing junction 58, an amplitude scaler 60, and another summing junction 62. The processed detail signals $d_i$, i=1, 2,3 are summed in the summing junction 58 and then provided to the amplitude scaler 60 for further processing. The amplitude scaler 60 functions to scale down detail signal values with amplitudes greater than a certain threshold. Such amplitude values can cause over-enhancement and, therefore, make the enhanced image look unnatural.

The down-scaling is performed in a non-linear manner with larger amplitude values scaled down more than smaller amplitude values. However, after down-scaling, originally smaller amplitude values should still have smaller amplitudes than those originally larger amplitude values. As such, in the scaling process, only the amplitude (i.e. the absolute value) of each value is scaled, and the sign of the value remains unchanged.

Accordingly, once a scaler(x) function is defined for arbitrary values x≧0, negative values can be scaled according to relation (3):

$$\text{scaler}(x) = -\text{scaler}(-x) \text{ for } x < 0. \tag{3}$$

In the example detail enhancement system 30, a logarithmic function is used as the scaling function. As such, an example amplitude scaler function, scaler ( ), can be expressed by relation (4) for x≧0, wherein:

$$\text{scaler}(x) = \begin{cases} \min(x, 6.0 * \ln(x)) & \text{if } x > 1 \\ 0 & \text{if } 0 \leq x \leq 1 \end{cases} \tag{4}$$

Figure 5:
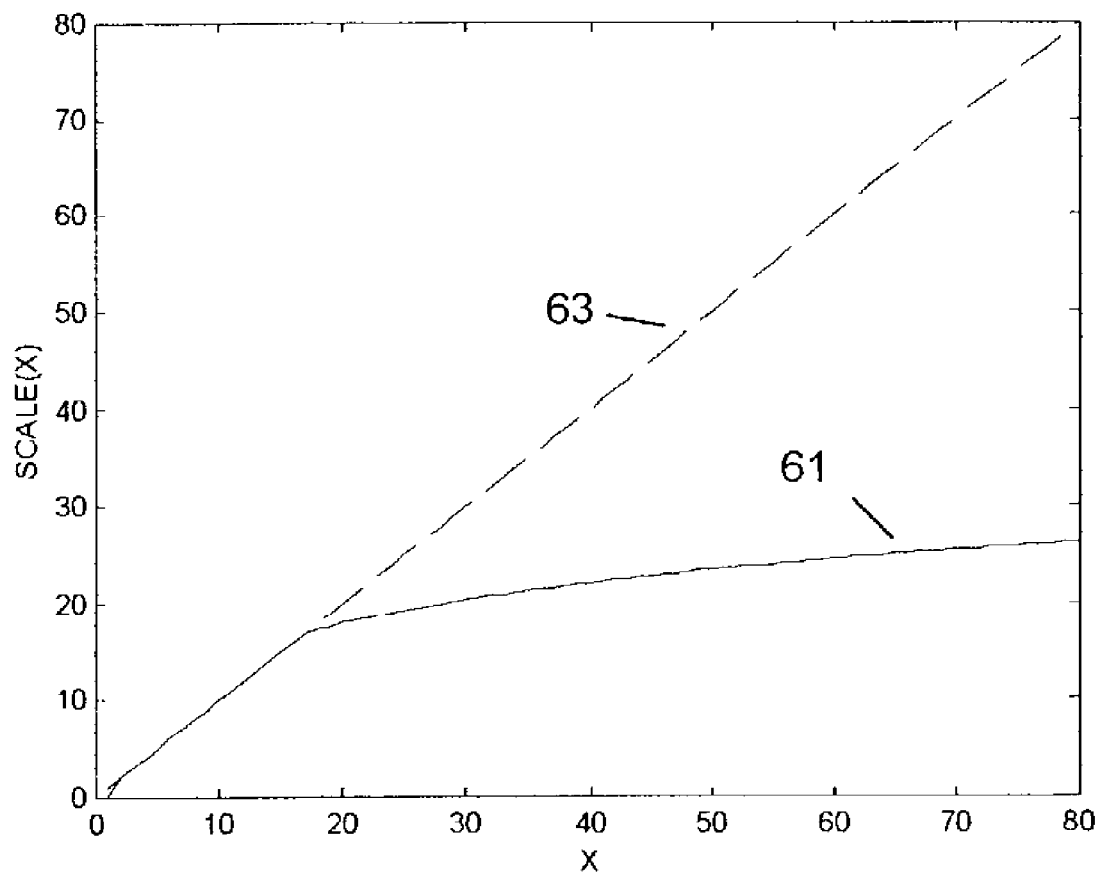
FIG. 5 shows an example amplitude scaler function for the system of FIG. 1B.

FIG. 5 shows an example curve 61 representing an amplitude scaler function with input data in the range of [0, 80]. The dashed line 63 indicates the case of no amplitude scaling. For any enhancement value between 0 and 80, the scaled value falls between 0 and 27. While large amplitude values are effectively scaled down, small amplitude values are well preserved. Alternatively, in another embodiment of the present invention, amplitude scaling can be applied to each detail signal separately, before the detail signals are combined to generate an overall detail signal that is added to the input signal. An example amplitude scaler is described in the above mentioned commonly assigned, co-pending patent application Ser. No. 10/355,721, filed on Jan. 31, 2003, titled "Method and Apparatus of Image Detail Enhancement Using Filter Bank", incorporated herein by reference In the detail enhancement system 30, the relationship between the final enhanced output J and the original input I can be expressed by an example relation (5):

$$J = \text{scaler}\left(\sum_{i=1,2,3} d_i\right) \tag{5}$$
$$= \text{scaler}\left(\sum_{i=1,2,3} (G_i * s_i * \text{coring}_i(f_i(I)))\right)$$

As such, the detail filters are used to extract image details in different frequency ranges, wherein each detail filter is associated with a coring block separately. The output of each detail filter is provided to a coring block for processing. Further, a shoot suppression block is associated with each detail filter to check the luminance pattern of the pixels in the input image, centered with the current pixel, within the filtering range of each detail filter and calculate a shoot suppression factor accordingly.

For each detail filter, the output from its associated coring block and shoot suppression block as well as a gain coefficient are combined together. The combination results from all the three detail filters are then summed up and provided to an amplitude scaler. The amplitude scaler scales down the detail signal values in a non-linear manner so that larger amplitude values are scaled down more than smaller amplitude values. However after amplitude scaling, originally smaller amplitude values still have smaller amplitudes than those originally bigger amplitude values. The output from the amplitude scaler is added back to the original image as enhanced details. As such, detail enhancement according to the present invention is suitable for different types of digital video images mentioned above.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned system 30 according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for image detail enhancement, comprising the steps of:
    (a) filtering an input signal representing a digital image, through each of a plurality of detail filters, each filter having a frequency response covering a selected frequency range, wherein the output of each filter forms a detail signal representing an enhancement such that the detail signals are extracted at different frequency ranges;
    (b) performing a coring function on each detail signal to generate a detail signal with reduced noise;
    (c) determining a shoot suppression factor for each detail signal based on the image characteristics of the image details in order to substantially suppress shoot artifacts in the enhanced image details;
    (d) applying each shoot suppression factor to the corresponding noise-reduced detail signal to generate an associated processed detail signal; and
    (e) combining the processed detail signals with the input signal to generate enhanced signal representing a detail enhanced image.

2. The method of claim 1, wherein each filter has a frequency range essentially different than that of the other filters.

3. The method of claim 1, wherein one or more of the filters is a high pass filter.

4. The method of claim 1, wherein one or more of the filters is a band pass filter.

5. The method of claim 1, wherein each filter covers a selected frequency range such that the associated output detail signal is in the corresponding frequency range from the input signal.

6. A method for image detail enhancement, comprising the steps of:
    (a) filtering an input sianal representing a digital image, through each of a plurality of detail filters, each filter having a frequency response covering a selected frequency range, wherein the output of each filter fonns a detail signal representing an enhancement;
    (b) performing a coring function on each detail signal to generate a detail signal with reduced noise:
    (c) determining a shoot suppression factor for each detail signal based on the image characteristics of the image details in order to substantially suppress shoot artifacts in the enhanced image details;
    (d) applying each shoot suppression factor to the corresponding noise-reduced detail signal, and multiplying each noise-reduced detail signal by a gain coefficient, to generate an associated processed detail signal; and (e) combining the processed detail signals with the input signal to generate enhanced signal representing a detail enhanced image.

7. The method of claim 6, wherein one or more of the gain coefficients are adjustable.

8. A method for image detail enhancement, comprising the steps of:
(a) filtering an input signal representing a digital image, through each of a plurality of detail filters, each filter having a frequency response covering a selected frequency range, wherein the output of each filter forms a detail signal representing an enhancement;
(b) performing a coring function on each detail signal to generate a detail signal with reduced noise;
(c) determining a shoot suppression factor for each detail signal based on the image characteristics of the image details in order to substantially suppress shoot artifacts in the enhanced image details;
(d) applying each shoot suppression factor to the corresponding noise-reduced detail signal to generate an associated processed detail signal; and
(e) combining the processed detail signals with the input signal by:
combining the processed detail signals to generate an overall detail signal;
applying amplitude scaling to the overall detail signal to generate a scaled detail signal wherein amplitude of enhancement values above a threshold in the overall detail signal is essentially scaled down; and
combining the scaled detail signal with the input signal to generate an enhanced signal representing a detail enhanced image.

9. The method of claim 8, wherein the relationship between the enhanced signal, J, and the input signal, I, is expressed as:

$$J = \mathrm{scaler}\left(\sum_{i=1,2,3} (G_i * s_i * coring_i(f_i(I)))\right),$$

wherein $f_i$ is a convolution operation performed in a detail filter i,
$coring_i$ is the coring function for each filter,
$s_i$ is the shoot suppression factor for each filter at a current pixel position,
$G_i$ is an adjustable gain coefficient for each detail signal, and
scaler is the scaling function for the amplitude scaling.

10. The method of claim 9, wherein the coring function is expressed as:

$$\mathrm{coring}(x) = \begin{cases} (\max(x, T_c) - T_c) * R/(R - T_c) & \text{if } x \in [0, R] \\ (\min(x, -T_c) + T_c) * R/(R - T_c) & \text{if } x \in [-R, 0) \end{cases}$$

wherein,
R is an input data dynamic range for the coring function,
$T_c$ is a threshold value for the coring function, such that R and $T_c$ may be different for each coring function depending on the associated detail filter.

11. The method of claim 9, wherein each shoot suppression factor $s_i$, i=1, 2, 3 is determined by calculating a symmetry factor based on the luminance values of the neighboring image pixels centered with a current image pixel within the filtering range of the corresponding detail filter.

12. The method of claim 9, wherein the scaling function is expressed as: for values $x \geq 0$, $$\mathrm{scaler}(x) = \begin{cases} \min(x, 6.0 * \ln(x)) & \text{if } x > 1 \\ 0 & \text{if } 0 \leq x \leq 1 \end{cases}$$

for x<0,
scaler(x)=−scaler(−x).

13. A method for image detail enhancement, comprising the steps of:
(a) filtering an input signal representing a digital image, through each of a plurality of detail filters, each filter having a frequency response covering a selected frequency range, wherein the output of each filter forms a detail signal representing an enhancement:
(b) performing a coring function on each detail signal to generate a detail signal with reduced noise;
(c) determining a shoot suppression factor for each detail signal based on the image characteristics of the image details in order to substantially suppress shoot artifacts in the enhanced image details;
(d) applying each shoot suppression factor to the corresponding noise-reduced detail signal to generate an associated processed detail signal; and
(e) combining the processed detail signals with the input signal by:
applying amplitude scaling to each processed detail signal to generate a scaled detail signal wherein amplitude of enhancement values above a threshold in each processed detail signal is essentially scaled down; and
combining the scaled detail signals with the input signal to generate an enhanced signal representing a detail enhanced image.

14. An image detail enhancement device for enhancing digital video image represented by an input signal, comprising:
a plurality of filters, each filter having a frequency response covering a frequency range, the input signal separately filtered by each filter to generate a corresponding detail signal representing an enhancement;
a plurality of coring blocks corresponding to the plurality of filters, each coring block reducing noise in a detail signal to generate a corresponding noise-reduced detail signal;
a plurality of shoot suppressors corresponding to the plurality of filters, each shoot suppressor determining a shoot suppression factor for each corresponding detail signal based on the image characteristics of the image details in order to substantially suppress shoot artifacts in the enhanced image details;
a plurality of combiners corresponding to the plurality of filters, wherein each combiner applies each shoot suppression factor to the corresponding noise-reduced detail signal to generate an associated processed detail signal; and
a junction device that combines the processed detail signals with the input signal to generate an enhanced signal representing a detail enhanced image.

15. The image detail enhancement device of claim 14, wherein each filter has a frequency range essentially different than that of the other filters.

16. The image detail enhancement device of claim 14, wherein one or more of the filters is a high pass filter.

17. The image detail enhancement device of claim 14, wherein one or more of the filters is a band pass filter.

18. The image detail enhancement device of claim 14, wherein each filter covers a selected frequency range such that the associated output detail signal is in the corresponding frequency range from the input signal.

19. The image detail enhancement device of claim 14, wherein each combiner comprises a multiplier, such that each multiplier multiplies each corresponding noise-reduced detail signal by a gain coefficient before multiplication with the corresponding shoot suppression factor.

20. The image detail enhancement device of claim 19, wherein one or more of the gain coefficients are adjustable.

21. The image detail enhancement device of claim 14, further comprising:
- a junction node that combines the processed detail signals to generate an overall detail signal;
- an amplitude scaler that applies amplitude scaling to the overall detail signal to generate a scaled detail signal wherein amplitude of enhancement values above a threshold in the overall detail signal is essentially scaled down;
- such that the junction device combines the scaled detail signal with the input signal to generate an enhanced signal representing a detail enhanced image.

22. The image detail enhancement device of claim 21, wherein the relationship between the enhanced signal, J, and the input signal, I, is expressed as:

$$J = \text{scaler}\left(\sum_{i=1,2,3} (G_i * s_i * \text{coring}_i(f_i(I)))\right),$$

wherein $f_i$ is a convolution operation performed in a filter i, $\text{coring}_i$ is the coring function of each coring block, $s_i$ is the shoot suppression factor determined by each shoot suppressor at a current pixel position, $G_i$ is an adjustable gain coefficient for each detail signal, and scaler is the scaling function of the amplitude scaler.

23. The image detail enhancement device of claim 22, wherein the coring function is expressed as:

$$\text{coring}(x) = \begin{cases} (\max(x, T_c) - T_c) * R/(R - T_c) & \text{if } x \in [0, R] \\ (\min(x, -T_c) + T_c) * R/(R - T_c) & \text{if } x \in [-R, 0) \end{cases}$$

wherein,

R is an input data dynamic range for the coring function, $T_c$ is a threshold value for the coring function, such that R and $T_c$ may be different for each coring function depending on the associated detail filter.

24. The image detail enhancement device of claim 22, wherein each shoot suppression factor $s_i$, i=1, 2, 3 is determined by calculating a symmetry factor based on the luminance values of the neighboring image pixels centered with a current image pixel within the filtering range of the corresponding detail filter.

25. The image detail enhancement device of claim 22, wherein the scaling function is expressed as:

for values $x \geq 0$, $$\text{scaler}(x) = \begin{cases} \min(x, 6.0 * \ln(x)) & \text{if } x > 1 \\ 0 & \text{if } 0 \leq x \leq 1 \end{cases}$$

for x<0, scaler(x)=−scaler(−x).

26. The method of claim 1 wherein performing a coring function on each detail signal further includes the steps of performing a coring function on each detail signal to generate a detail signal with reduced noise and reduced ringing artifacts around edge areas in the image.

* * * * *